United States Patent
Ekin et al.

(10) Patent No.: US 10,633,477 B2
(45) Date of Patent: Apr. 28, 2020

(54) EXTENDED POT-LIFE FOR LOW TEMPERATURE CURING POLYURETDIONE RESINS

(71) Applicants: Covestro LLC, Pittsburgh, PA (US); Covestro Deutschland AG, Leverkusen (DE)

(72) Inventors: Alan Ekin, Coraopolis, PA (US); David P. Zielinski, Cranberry Township, PA (US)

(73) Assignees: Covestro LLC, Pittsburgh, PA (US); Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/933,553

(22) Filed: Mar. 23, 2018

(65) Prior Publication Data

US 2019/0292297 A1   Sep. 26, 2019

(51) Int. Cl.

| | |
|---|---|
| *C08G 18/02* | (2006.01) |
| *C08K 5/29* | (2006.01) |
| *C08G 18/48* | (2006.01) |
| *C08G 18/62* | (2006.01) |
| *C08G 18/44* | (2006.01) |
| *C09D 175/02* | (2006.01) |
| *C09J 175/02* | (2006.01) |
| *C08G 18/42* | (2006.01) |
| *C08G 18/79* | (2006.01) |
| *C08G 18/18* | (2006.01) |
| *C08G 18/20* | (2006.01) |
| *C09D 175/04* | (2006.01) |
| *C09J 175/04* | (2006.01) |

(52) U.S. Cl.
CPC ....... *C08G 18/027* (2013.01); *C08G 18/1858* (2013.01); *C08G 18/2027* (2013.01); *C08G 18/2036* (2013.01); *C08G 18/2063* (2013.01); *C08G 18/4236* (2013.01); *C08G 18/4277* (2013.01); *C08G 18/44* (2013.01); *C08G 18/48* (2013.01); *C08G 18/622* (2013.01); *C08G 18/6229* (2013.01); *C08G 18/798* (2013.01); *C08K 5/29* (2013.01); *C09D 175/04* (2013.01); *C09J 175/04* (2013.01); *C08G 2190/00* (2013.01); *C08K 2201/012* (2013.01); *C09D 175/02* (2013.01); *C09J 175/02* (2013.01)

(58) Field of Classification Search
CPC ...... C08G 18/027; C08G 18/44; C08G 18/48; C08G 18/6229; C08G 2190/00; C08G 18/4277; C08G 18/622; C08G 18/4236; C08G 18/798; C08G 18/1858; C08G 18/2027; C08G 18/2036; C08G 18/2063; C08K 5/29; C08K 2201/012; C09J 175/02; C09J 175/04; C09D 175/02; C09D 175/04

See application file for complete search history.

(56) References Cited

U.S. PATENT DOCUMENTS

| | | |
|---|---|---|
| 3,169,949 A | 2/1965 | Büning |
| 5,814,689 A | 9/1998 | Goldstein et al. |
| 5,861,193 A | 1/1999 | Goldstein et al. |
| 8,791,223 B2 | 7/2014 | Zalich et al. |
| 9,080,074 B2 | 7/2015 | Shaffer et al. |
| 9,102,785 B2 | 8/2015 | Martz et al. |
| 2002/0068808 A1 | 6/2002 | Kometani et al. |
| 2006/0052527 A1 | 3/2006 | Weikard et al. |
| 2006/0247341 A1 | 11/2006 | Hsieh et al. |
| 2008/0194787 A1* | 8/2008 | Weiss ................ C08G 18/0895 528/67 |
| 2009/0264587 A1 | 10/2009 | Blum et al. |
| 2013/0303720 A1* | 11/2013 | Krause .................. C08G 18/10 528/54 |
| 2014/0221594 A1 | 8/2014 | Duggal et al. |
| 2014/0275345 A1* | 9/2014 | Williams .............. C08F 124/00 523/445 |
| 2016/0017179 A1 | 1/2016 | Spyrou et al. |
| 2017/0349693 A1 | 7/2017 | Spryou et al. |

FOREIGN PATENT DOCUMENTS

DE   102008040967 A1   2/2010

\* cited by examiner

*Primary Examiner* — Rabon A Sergent

(74) *Attorney, Agent, or Firm* — John E. Mrozinski, Jr.

(57) ABSTRACT

The present invention provides a reaction mixture comprising a polyuretdione resin, a neutralized polyol, an acid-blocked tertiary amine catalyst, and optionally, an additive package selected from the group consisting of flow control additives, and wetting agents, and solvents, wherein the acid has a $pK_a$ of greater than 4.82. Compositions made from the reaction mixture of the present invention may be catalyzed at temperatures from room temperature to 130° C. and are particularly applicable in or as coatings, adhesives, castings, composites, and sealants with good performance and extended pot-life.

29 Claims, No Drawings

EXTENDED POT-LIFE FOR LOW TEMPERATURE CURING POLYURETDIONE RESINS

FIELD OF THE INVENTION

The present invention relates, in general to polymers, and more specifically, to compositions useful as coatings, adhesives, castings, composites, and sealants which are made with polyuretdiones and polyols in the presence of acid blocked tertiary amine catalysts to extend pot-life of the resultant coatings, adhesives, castings, composites, and sealants without diminishing performance.

BACKGROUND OF THE INVENTION

Polyurethane-forming compositions are widely used in a variety of commercial, industrial and household applications, such as in automotive clear-coat and seat cushion applications. Polyurethane systems that employ isocyanates which are pre-reacted with monofunctional reagents to form relatively thermally labile compounds are called blocked isocyanates. Uretdiones are a type of blocked isocyanate. Uretdiones are typically prepared by dimerizing an isocyanate to form a uretdione with unreacted isocyanate groups which can then be extended with a polyol to form a polymeric material containing two or more uretdione groups in the polymer chain. In some literature, uretdiones are referred to as "1,3-diaza-2,4-cyclobutanones", "1,3-diazatidin-2,4-diones", "2,4-dioxo-1,3-diazetidines", "urethdiones" or "uretidiones". Typically, the polymer has few, if any, free isocyanate groups, which is achieved by controlling the stoichiometry of the polyisocyanate, polyol and by the use of a blocking agent.

Polyuretdiones and polyols may react in a very fast fashion in the presence of a tertiary amine catalyst and thus have a short pot-life. To the best of the present inventors' knowledge, no one has developed a cross-linking approach using acid-blocked tertiary amine catalysts in combination with uretdiones and polyols.

To reduce or eliminate pot-life problems, a need exists in the art for an alternative cross-linking approach to obtain compositions having physical properties similar to polyurethane compositions.

SUMMARY OF THE INVENTION

Accordingly, the present invention attempts to alleviate problems inherent in the art by providing such an alternative cross-linking approach to obtain compositions having physical properties similar to those of polyurethane compositions. Various embodiments of the inventive approach involve crosslinking polyuretdione resins with polyols in the presence of an acid-blocked tertiary amine catalyst in which the acid has a $pK_a$ of greater than 4.82. The tertiary amine catalyst may be activated at any temperature from room temperature (20-25° C.) or to 130° C. The inventive compositions may extend the pot-life of resultant coatings, adhesives, castings, composites, and sealants.

It is understood that the invention disclosed and described in this specification is not limited to the embodiments summarized in this Summary.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a).

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is used in certain instances. Thus, the articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Although compositions and methods are described in terms of "comprising" various components or steps, the compositions and methods can also "consist essentially of" or "consist of" the various components or steps.

In various embodiments, the present invention provides a reaction mixture comprising a polyuretdione resin; a polyol; and an acid-blocked tertiary amine catalyst; and optionally, an additive package (e.g. flow control, wetting agent) and solvent, wherein the acid has a $pK_a$ of greater than 4.82. In certain embodiments, the present invention further provides a method comprising, reacting a polyuretdione resin with a polyol in the presence of an acid-blocked tertiary amine catalyst, wherein the reaction mixture optionally includes an additive package (e.g., flow control, wetting agent) and solvent, and wherein the acid has a $pK_a$ of greater than 4.82. The acid-blocked tertiary amine catalyst may be activated at any temperature from room temperature (20° C.) to 130° C.

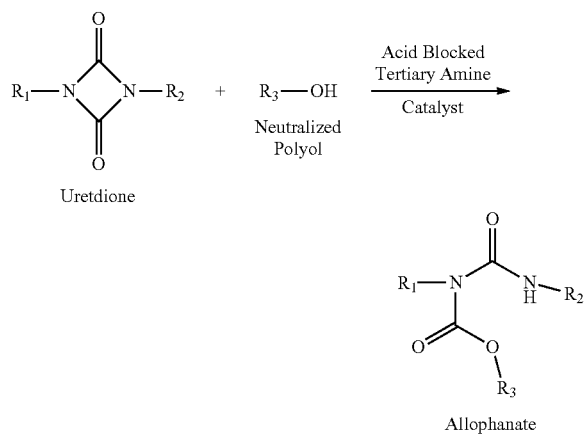

The inventive allophanate polymer is particularly applicable in coatings, adhesives, castings, composites, and sealants.

As used herein, the term "polymer" encompasses prepolymers, oligomers and both homopolymers and copolymers; the prefix "poly" in this context referring to two or more. As used herein, the term "molecular weight", when used in reference to a polymer, refers to the number average molecular weight, unless otherwise specified.

As used herein, the term "coating composition" refers to a mixture of chemical components that will cure and form a coating when applied to a substrate.

The terms "adhesive" or "adhesive compound", refer to any substance that can adhere or bond two items together. Implicit in the definition of an "adhesive composition" or "adhesive formulation" is the concept that the composition or formulation is a combination or mixture of more than one species, component or compound, which can include adhesive monomers, oligomers, and polymers along with other materials.

A "sealant composition" refers to a composition which may be applied to one or more surfaces to form a protective barrier, for example, to prevent ingress or egress of solid, liquid or gaseous material or alternatively to allow selective permeability through the barrier to gas and liquid. In particular, it may provide a seal between surfaces.

A "casting composition" refers to a mixture of liquid chemical components which is usually poured into a mold containing a hollow cavity of the desired shape, and then allowed to solidify.

A "composite" refers to a material made from two or more polymers, optionally containing other kinds of materials. A composite has different properties from those of the individual polymers/materials which make it up.

"Cured," "cured composition" or "cured compound" refers to components and mixtures obtained from reactive curable original compound(s) or mixture(s) thereof which have undergone a chemical and/or physical changes such that the original compound(s) or mixture(s) is(are) transformed into a solid, substantially non-flowing material. A typical curing process may involve crosslinking.

The term "curable" means that an original compound(s) or composition material(s) can be transformed into a solid, substantially non-flowing material by means of chemical reaction, crosslinking, radiation crosslinking, or the like. Thus, compositions of the invention are curable, but unless otherwise specified, the original compound(s) or composition material(s) is(are) not cured.

The compositions useful in the present invention comprise a polyisocyanate. As used herein, the term "polyisocyanate" refers to compounds comprising at least two unreacted isocyanate groups, such as three or more unreacted isocyanate groups. The polyisocyanate may comprise diisocyanates such as linear aliphatic polyisocyanates, aromatic polyisocyanates, cycloaliphatic polyisocyanates and aralkyl polyisocyanates.

Particularly preferred in the present invention are those blocked isocyanates known as uretdiones. The uretdiones useful in the invention may be obtained by catalytic dimerization of polyisocyanates by methods which are known to those skilled in the art. Examples of dimerization catalysts include, but are not limited to, trialkylphosphines, aminophosphines and aminopyradines such as dimethylaminopyridines, and tris(dimethylamino)phosphine, as well as any other dimerization catalyst. The result of the dimerization reaction depends, in a manner known to the skilled person, on the catalyst used, on the process conditions and on the polyisocyanates employed. In particular, it is possible for products to be formed which contain on average more than one uretdione group per molecule, the number of uretdione groups being subject to a distribution. The (poly) uretdiones may optionally contain isocyanurate, biuret, allophanate, and iminooxadiazine dione groups in addition to the uretdione groups.

The uretdiones are NCO-functional compounds and may be subjected to a further reaction, for example, blocking of the free NCO groups or further reaction of NCO groups with NCO-reactive compounds having a functionality of 2 or more to extend the uretdiones to form polyuretdione prepolymers. This gives compounds containing uretdione groups and of higher molecular weight, which, depending on the chosen proportions, may also contain NCO groups, be free of NCO groups or may contain isocyanate groups that are blocked.

Suitable blocking agents include, but are not limited to, alcohols, lactams, oximes, malonates, alkyl acetoacetates, triazoles, phenols, imidazoles, pyrazoles and amines, such as butanone oxime, diisopropylamine, 1,2,4-triazole, dimethyl-1,2,4-triazole, imidazole, diethyl malonate, ethyl acetoacetate, acetone oxime, 3,5-dimethylpyrazole, caprolactam, N-tert-butylbenzylamine and cyclopentanone including mixtures of these blocking agents.

Examples of NCO-reactive compounds with a functionality of two or more include polyols. In some embodiments, the NCO-reactive compounds are used in amounts sufficient to react with all free NCO groups in the uretdione. By "free NCO groups" it is meant all NCO groups not present as part of the uretdione, isocyanurate, biuret, allophanate and iminooxadiazine dione groups.

The resulting polyuretdione contains at least 2, such as from 2 to 10 uretdione groups. More preferably, the polyuretdione contains from 5% to 45% uretdione, 10% to 55% urethane, and less than 2% isocyanate groups. The percentages are by weight based on total weight of resin containing uretdione, urethane, and isocyanate.

Suitable polyisocyanates for producing the uretdiones useful in embodiments of the invention include, organic diisocyanates represented by the formula

R(NCO)$_2$ wherein R represents an organic group obtained by removing the isocyanate groups from an organic diisocyanate having (cyclo)aliphatically bound isocyanate groups and a molecular weight of 112 to 1000, preferably 140 to 400. Preferred diisocyanates for the invention are those represented by the formula wherein R represents a divalent aliphatic hydrocarbon group having from 4 to 18 carbon atoms, a divalent cycloaliphatic hydrocarbon group having from 5 to 15 carbon atoms, or a divalent araliphatic hydrocarbon group having from 7 to 15 carbon atoms.

Examples of the organic diisocyanates which are particularly suitable for the present invention include 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and 1,4-xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI)—bio-based, and, isomers of any of these; or combinations of any of these. Mixtures of diisocyanates may also be used. Preferred diisocyanates include 1,6-hexamethylene diisocyanate, isophorone diisocyanate, and bis(4-isocyanatocyclohexyl)-methane because they are readily available and yield relatively low viscosity polyuretdione polyurethane oligomers.

In some embodiments, the uretdiones may comprise from 35% to 85% resin solids in the composition of present invention, excluding solvents, additives or pigments. In other embodiments, from 50% to 85% and in still other embodiments, 60% to 85%. The uretdiones may comprise any resin solids amount ranging between any combinations of these values, inclusive of the recited values.

As those skilled in the art are aware, some acid-blocked tertiary amine catalysts tend to dissociate reversibly when heated. Such catalysts are frequently included in the formulations for the production of polyurethane foams as the heating necessary to activate the catalyst produces $CO_2$, which acts as a blowing agent.

In various embodiments, the tertiary amine in the tertiary amine catalyst includes, but is not limited to, triethylene diamine; substituted imidazoles such as 1-2 dimethylimidazole, 1-methyl-2-hydroxyethylimidazole; N,N'dimethylpiperazine or substituted piperazines such as aminoethylpiperazine or bis(N-methyl piperazine)ethylurea or N,N', N'trimethyl aminoethylpiperazine; N-methylpyrrolidines and substituted methyl pyrrolidines such as 2-aminoethyl-N,methylpyrrolidines or Bis(N-methylpyrrolidine)ethyl urea; or other tertiary aminoalkylureas or bis(tertiary amino alkyl) urea such as N,N-(3-dimethylaminopropyl)urea; 3-dimethylaminopropylamine; N,N,N"N"tetramethyldipropylenetriamine; N,N-bis(3-dimethylaminopropyl) 1-3 propanediamine; N,N-dimethylamino-N',N'bis(hydroxyl-(2)-propylpropylene(1,3)diamine; tetramethylguanidine; dimethylaminopropylamine,1,2-bis-diisopropanol(3-dimethyl-aminopropylamine), substituted piperidines and aminotriazines such N$_5$N dimethylaminopropyl-S-triazine.

In certain embodiments, the tertiary amine catalysts are acid blocked versions of 1,8-diazabicyclo[5.4.0]undec-7ene, 7-methyl-1,5,7-triazabicyclo[4.4.0]dec-5-ene, 1,4,5,6-tetrahydro-1,2-dimethylpyrimidine, 1,2,4-triazole, sodium derivative and 2-tert-butyl-1,1,3,3-tetramethylguanidine, and combinations thereof.

Suitable acids for blocking the tertiary amines in various embodiments of the invention include organic carboxylic acids including $C_1$-$C_{20}$ mono- or dicarboxylic acids, such as formic, acetic, propionic, butyric, caproic, carbolic, 2-ethylhexanoic, caprylic, cyanoacetic, pyruvic, benzoic, oxalic, malonic, succinic, phthalic, salicylic and maleic acids.

Examples of such acid-blocked tertiary amine catalysts useful in embodiments of the present invention include, but are not limited to, those available from Air Products under the POLYCAT, DABCO, LK and VERSALINK trade names, those available from Momentive Performance Materials under NIAX trade name; and the JEFFCAT catalysts from Huntsman.

In some embodiments of the present invention, the acid-blocked tertiary amine catalysts may be heated to a temperature of 100° C. In other embodiments, a broader temperature range of from room temperature (~20° C.) to 130° C. can be used.

The present inventors have unexpectedly found that the $pK_a$ of the acid component of the acid-blocked tertiary amine catalyst has an effect on the pot-life and physical properties of the resultant materials. Those acids having a $pK_a$ of 4.82 and below appear to be less effective at prolonging pot-life and retaining physical properties. Those acids having a $pK_a$ of greater than 5.0 produce better results and those acids having a $pK_a$ of greater than 5.5 produce even better results. The present inventors believe that those acids having a $pK_a$ of from greater than 4.82 to 10 provide the best combination of pot-life and physical properties in the resultant coatings, adhesives, castings, composites, and sealants made from the compositions of the invention.

The polyols useful in the present invention may be either low molecular weight (62-399 Da, as determined by gel permeation chromatography) or high molecular weight (400 to 10,000 Da, as determined by gel permeation chromatography) materials and in various embodiments will have average hydroxyl values as determined by ASTM E222-10, Method B, of between 1000 and 10, and preferably between 500 and 50.

The polyols in the present invention include low molecular weight diols, triols and higher alcohols and polymeric polyols such as polyester polyols, polyether polyols, polyurethane polyols and hydroxy-containing (meth)acrylic polymers.

The low molecular weight diols, triols and higher alcohols useful in the instant invention are known to those skilled in the art. In many embodiments, they are monomeric and have hydroxy values of 200 and above, usually within the range of 1500 to 200. Such materials include aliphatic polyols, particularly alkylene polyols containing from 2 to 18 carbon atoms. Examples include ethylene glycol, 1,4-butanediol, 1,6-hexanediol; cycloaliphatic polyols such as cyclohexane dimethanol. Examples of triols and higher alcohols include trimethylol propane and pentaerythritol. Also useful are polyols containing ether linkages such as diethylene glycol and triethylene glycol.

In various embodiments, the suitable polyols are polymeric polyols having hydroxyl values less than 200, such as 10 to 180. Examples of polymeric polyols include polyalkylene ether polyols, polyester polyols including hydroxyl-containing polycaprolactones, hydroxy-containing (meth)acrylic polymers, polycarbonate polyols and polyurethane polymers.

Examples of polyether polyols include poly(oxytetramethylene) glycols, poly(oxyethylene) glycols, and the reaction product of ethylene glycol with a mixture of propylene oxide and ethylene oxide.

Also useful are polyether polyols formed from the oxyalkylation of various polyols, for example, glycols such as ethylene glycol, 1,4-butane glycol, 1,6-hexanediol, and the like, or higher polyols, such as trimethylol propane, pentaerythritol and the like. One commonly utilized oxyalkylation method is by reacting a polyol with an alkylene oxide, for example, ethylene oxide in the presence of an acidic or basic catalyst.

Polyester polyols can also be used as a polymeric polyol component in the certain embodiments of the invention. The polyester polyols can be prepared by the polyesterification of organic polycarboxylic acids or anhydrides thereof with organic polyols. Preferably, the polycarboxylic acids and polyols are aliphatic or aromatic dibasic acids and diols.

The diols which may be employed in making the polyester include alkylene glycols, such as ethylene glycol and butylene glycol, neopentyl glycol and other glycols such as cyclohexane dimethanol, caprolactone diol (for example, the reaction product of caprolactone and ethylene glycol), polyether glycols, for example, poly(oxytetramethylene) glycol and the like. However, other diols of various types and, as indicated, polyols of higher functionality may also be utilized in various embodiments of the invention. Such higher polyols can include, for example, trimethylol propane, trimethylol ethane, pentaerythritol, and the like, as well as higher molecular weight polyols such as those produced by oxyalkylating low molecular weight polyols. An example of such high molecular weight polyol is the reaction product of 20 moles of ethylene oxide per mole of trimethylol propane.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid (where acids are referred to above, it is understood that the anhydrides of those acids which form anhydrides can be used in place of the acid). Also, lower alkyl esters of acids such as dimethyl glutamate can be used.

Besides polyester polyols formed from polybasic acids and polyols, polycaprolactone-type polyesters can also be employed. These products are formed from the reaction of a cyclic lactone such as ε-caprolactone with a polyol with primary hydroxyls such as those mentioned above. Such products are described in U.S. Pat. No. 3,169,949.

In addition to the polyether and polyester polyols, hydroxy-containing (meth)acrylic polymers or (meth)acrylic polyols can be used as the polyol component.

Among the (meth)acrylic polymers are polymers of 2 to 20 percent by weight primary hydroxy-containing vinyl monomers such as hydroxyalkyl acrylate and methacrylate having 2 to 6 carbon atoms in the alkyl group and 80 to 98 percent by weight of other ethylenically unsaturated copolymerizable materials such as alkyl(meth)acrylates; the percentages by weight being based on the total weight of the monomeric charge.

Examples of suitable hydroxy alkyl(meth)acrylates are hydroxy ethyl and hydroxy butyl(meth)acrylate. Examples of suitable alkyl acrylates and (meth)acrylates are lauryl methacrylate, 2-ethylhexyl methacrylate and n-butyl acrylate.

In addition to the acrylates and methacrylates, other copolymerizable monomers which can be copolymerized with the hydroxyalkyl (meth)acrylates include ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, α-methyl styrene, α-methyl chlorostyrene, vinyl butyrate, vinyl acetate, alkyl chloride, divinyl benzene, diallyl itaconate, triallyl cyanurate and mixtures thereof. Preferably, these other ethylenically unsaturated materials are used in admixture with the above-mentioned acrylates and methacrylates.

Suitable hydroxy-functional polycarbonate polyols may be those prepared by reacting monomeric diols (such as 1,4-butanediol, 1,6-hexanediol, di-, tri- or tetraethylene glycol, di-, tri- or tetrapropylene glycol, 3-methyl-1,5-pentanediol, 4,4'-dimethylolcyclohexane and mixtures thereof) with diaryl carbonates (such as diphenyl carbonate, dialkyl carbonates (such as dimethyl carbonate and diethyl carbonate), alkylene carbonates (such as ethylene carbonate or propylene carbonate), or phosgene. Optionally, a minor amount of higher functional, monomeric polyols, such as trimethylolpropane, glycerol or pentaerythritol, may be used.

In various embodiments of the invention, the polyol is neutralized, for example, by the addition of an acid scavenger. Acid scavengers should be covalently bonded to the acidic groups within the polyol. Acid scavengers may be from a family of reactants to carboxylic or acrylic acid groups such as carbodiimides, anhydrides, epoxies, trialkylorthoformates, amine compounds, or oxazolines. The present inventors believe, without wishing to be bound to any specific theory, that these acid scavengers covalently bind to carboxylic and acrylic acid groups within the polyols. Such compounds are commercially available from a variety of suppliers, such as for example, the monomeric carbodiimides sold under the STABAXOL trade name from Rhein Chemie, and bis(2,6-diisopropylphenyl) carbodiimide sold as EUSTAB HS-700 by Eutec Chemical Co., Ltd.

In certain embodiments of the invention, the polyol may be a polyurethane polyol. These polyols can be prepared by reacting any of the above-mentioned polyols with a minor amount of polyisocyanate (OH:NCO equivalent ratio greater than 1:1) so that free primary hydroxyl groups are present in the product. In addition to the high molecular weight polyols mentioned above, mixtures of both high molecular weight and low molecular weight polyols such as those mentioned above may be used.

The compositions of the present invention may further include any of a variety of additives such as defoamers, devolatilizers, surfactants, thickeners, flow control additives, colorants (including pigments and dyes) or surface additives.

Examples of suitable solvents include, but are not limited to aliphatic and aromatic hydrocarbons such as toluene, xylene, isooctane, acetone, butanone, methyl ethyl ketone, methyl amyl ketone, methyl isobutyl ketone, ethyl acetate, butyl acetate, pentyl acetate, tetrahydrofuran, ethyl ethoxypropionate, N-methyl-pyrrolidone, dimethylacetamide and dimethylformamide solvent naphtha, SOLVESSO 100 or HYDROSOL (ARAL), ethers, or mixtures thereof.

The composition of the invention may be contacted with the substrate by any methods known to those skilled in the art, including but not limited to, spraying, dipping, flow coating, rolling, brushing, pouring, and the like. In some embodiments, the inventive compositions may be applied in the form of paints or lacquers onto any compatible substrate, such as, for example, metals, plastics, ceramics, glass, and natural materials. In certain embodiments, the composition is applied as a single layer. In other embodiments, the inventive compositions may be applied as multiple layers as needed.

EXAMPLES

The non-limiting and non-exhaustive examples that follow are intended to further describe various non-limiting and non-exhaustive embodiments without restricting the scope of the embodiments described in this specification. All quantities given in "parts" and "percents" are understood to be by weight, unless otherwise indicated. Although the present invention is described in the instant Examples in the context of a coating, those skilled in the art will appreciate it can also be equally applicable to adhesives, castings, composites, and sealants. The reported $pK_a$ values below were provided by the manufacturer.

The following materials were used in preparing the compositions of the Examples:

| | |
|---|---|
| POLYOL A | an aromatic free, branched hydroxyl-bearing polyester polyol, commercially available from Covestro as DESMOPHEN 775 XP; |
| ADDITIVE A | an active antihydrolysis agent for polyester polyurethanes, being used as an acid scavenger for acidic groups within the polyols, commercially available from Rhein Chemie as STABAXOL I; |
| ADDITIVE B | a surface additive on polyacrylate-basis for solvent-borne coating systems and printing inks, commercially available from BYK Chemie as BYK 358N; |
| CATALYST A | 1,8-diazabicyclo[5.4.0]undec-7-ene (DBU), tertiary amine catalyst, commercially available from Air Products as POLYCAT DBU; |
| CATALYST B | a low emissive, acid-blocked ($pK_a$s of 2.89 and 5.51), tertiary amine catalyst based on DBU, ~50% DBU content, commercially available from Air Products as POLYCAT SA2LE; |
| CATALYST C | an acid-blocked ($pK_a$ of 10.0), tertiary amine catalyst, based on DBU, ~60% DBU content, commercially available from Air Products as POLYCAT SA-1; |
| CATALYST D | an acid-blocked ($pK_a$ of 4.82), heat activated tertiary amine catalyst based on DBU, ~40% DBU content, commercially available from Air Products as POLYCAT SA-102; |
| CATALYST E | an acid-blocked ($pK_a$ of 2.97), heat activated tertiary amine catalyst based on DBU, ~30% DBU content, commercially available from Momentive Performance Materials as NIAX A-575; |
| CATALYST F | an acid-blocked ($pK_a$s of 2.89 and 5.51), heat activated tertiary amine catalyst based on DBU, ~30% DBU content, commercially available from Air Products as POLYCAT SA8; |
| URETDIONE A | a 1-isocyanato-3-isocyanatomethyl-3,5,5-trimethyl cyclohexane (isophorone diisocyanate or IPDI)-based uretdione, commercially available from Covestro as CRELAN EF 403. |

Coating formulation 1 was prepared as follows: Prior to formulating 11.69 parts of POLYOL A and 0.12 parts of ADDITIVE A were mixed and stored at 80° C. for one week. In a 200 mL plastic container 11.81 parts of the ADDITIVE A and POLYOL A mixture, 0.47 parts ADDITIVE B, 6.60 parts n-butyl acetate (BA), 0.25 parts CATALYST A were added. The resulting mixture was mixed using a FLACK-TEK speed mixer for one minute. Then, 80.51 parts URETDIONE A solution (50% in n-butyl acetate) was added to the mixture. The resulting mixture was mixed for an additional minute followed by application using a drawdown bar onto test panels. The formulations of the other examples were made in a similar manner according to the amounts and ingredients listed in Table I.

For evaluation of microhardness and MEK Double Rubs, test samples were prepared by applying 4 mils (100 μm) wet film (2 mils (50 μm) dry) thickness of the formulation onto iron phosphate pre-treated 4"×12" (10.2 cm×30.5 cm) steel test panels (ACT B1000).

"Room temperature" films were cured at 20° C.-25° C. f or 24 hours before testing. The "100° C." films were cured at 100° C. for 30 minutes in an electric oven and left at room temperature for 24 hours before testing.

Microhardness ("Marten's hardness") measurements were done using FISCHERSCOPE H100C instrument according to the method described in DIN EN ISO 14577. Microhardness readings were taken under a 20 mN test load run to a maximum of 5 μm indentation depths over a 20 second application time. Results reported are an average of three readings for each formulation.

MEK double rubs were measured according to ASTM D4752-10(2015). Results reported are an average of three readings for each formulation.

Viscosities of the formulations were measured according to ASTM D7395-07(2012) using a BROOKFIELD RST Rheometer at 25° C., 100 s−1 shear rate for two minutes with a RST-50-1 spindle. "Initial viscosity" refers to the viscosity of the composition at the time it was made and "1 hour viscosity" refers to the viscosity of the composition after one hour of being made.

Table I, includes data comparing the various forms of catalysts containing acid-blocked and unblocked DBU. Included are results of hardness testing, chemical resistance by way of MEK double rubs and pot-life by viscosity over time. Formulations of Examples 1, 3, 5, 7, 9, and 11 are comparative in terms of DBU amounts (0.5% DBU loading (based on solids)) to the formulations of Examples 2, 4, 5, 6, 10, and 12 which utilize 1% DBU catalyst (based on solids). The catalyst levels included in the Table I account for both DBU catalyst and acid blocking agent. Examples 3, 4, 5, and 6 show improvement in pot-life without sacrificing physical properties in comparison to unblocked catalysts of Examples 1 and 2.

As indicated by examples, the $pK_a$ of the acid blocking agent has an effect on pot-life and physical properties. The $pK_a$ of acid blocking agent used in Examples 5 and 6 is 10 (Catalyst C), which shows improvement in pot-life without sacrificing physical properties. The $pK_a$ of acid blocking agent used in Examples 7 and 8 is 4.82 (Catalyst D), which shows improvement in pot-life; however, physical properties are lacking. The $pK_a$ of acid blocking agent used in Examples 9 and 10 is 2.97 (Catalyst E), which again shows improvement in pot-life; however, physical properties are lacking. The acid blocking agent used in Examples 3, 4, 11 and 12 has two $pK_a$ values and is the same (Catalyst B and Catalyst F). Catalyst B and Catalyst F has the same acid blocking agent. Examples 3 and 4 (using Catalyst B) show improvement in pot-life without sacrificing physical properties. Examples 11 and 12 (using Catalyst F) show improvement in pot-life; however, physical properties are lacking. The reason for the difference is with the amount of DBU that is present in comparison to acidic groups. Catalyst B has ~50% DBU in which both acid groups of $pK_a$ 2.89 and 5.51 are being used during blocking. Catalyst F has ~30% DBU in which the majority of the DBU is being blocking with stronger acid of $pK_a$ 2.89 rather than $pK_a$ 5.51. Comparison of performance of formulations using Catalyst B and F (Examples 3, 4, 11 and 12) gives a great indication of the role of $pK_a$ of acid blocking agent where higher than $pK_a$ of 4.82 is needed in order to improve pot-life without sacrificing physical performance.

The compositions of the present invention are particularly applicable in or as coatings, adhesives, castings, composites, and sealants with good performance and extended pot-life.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

1. A reaction mixture comprising: a polyuretdione resin; a neutralized polyol; an acid-blocked tertiary amine catalyst; and optionally, an additive package selected from the group consisting of flow control additives, wetting agents, and solvents, wherein the acid has a $pK_a$ of greater than 4.82.

2. The reaction mixture according to clause 1, wherein the polyuretdione resin comprises the reaction product of catalytic dimerization of an isocyanate.

3. The reaction mixture according to clause 2, wherein the isocyanate is selected from the group consisting of 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trim-

TABLE I

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Component 1 | | | | | | | | | | | | |
| POLYOL A | 11.69 | 11.63 | 11.63 | 11.52 | 11.65 | 11.56 | 11.60 | 11.46 | 11.63 | 11.52 | 11.56 | 11.37 |
| ADDITIVE A | 0.12 | 0.12 | 0.12 | 0.12 | 0.12 | 0.12 | 0.12 | 0.12 | 0.12 | 0.12 | 0.12 | 0.11 |
| ADDITIVE B | 0.47 | 0.47 | 0.47 | 0.46 | 0.47 | 0.47 | 0.47 | 0.46 | 0.47 | 0.46 | 0.47 | 0.46 |
| n-Butyl acetate (BA) | 6.60 | 6.81 | 6.81 | 7.23 | 6.74 | 7.09 | 6.91 | 7.43 | 6.48 | 6.58 | 7.09 | 7.77 |
| CATALYST A | 0.25 | 0.49 | | | | | | | | | | |
| CATALYST B ($pK_a$ 2.89, 5.51) | | | 0.49 | 0.97 | | | | | | | | |
| CATALYST C ($pK_a$ 10) | | | | | 0.41 | 0.81 | | | | | | |
| CATALYST D ($pK_a$ 4.82) | | | | | | | 0.61 | 1.20 | | | | |
| CATALYST E ($pK_a$ 2.97) | | | | | | | | | 0.81 | 1.61 | | |
| CATALYST F ($pK_a$ 2.89, 5.51) | | | | | | | | | | | 0.80 | 1.59 |
| Component 2 | | | | | | | | | | | | |
| URETDIONE A (50% in BA) | 80.51 | 80.11 | 80.11 | 79.34 | 80.25 | 79.59 | 79.92 | 78.96 | 80.11 | 79.34 | 79.60 | 78.33 |
| Total | 99.64 | 99.63 | 99.63 | 99.64 | 99.64 | 99.64 | 99.63 | 99.63 | 99.62 | 99.63 | 99.64 | 99.63 |
| Marten's Hardness (N/mm$^2$) | | | | | | | | | | | | |
| Room Temp. | 28.2 | 53.9 | 4.2 | 23.5 | 26.5 | 49.8 | 0.9 | 0.9 | 0.9 | 0.9 | 0.8 | 1.2 |
| 100° C. | 138.8 | 141.2 | 139.0 | 140.4 | 139.0 | 141.5 | 139.3 | 141.4 | 125.3 | 121.6 | 124.5 | 122.6 |
| MEK Double Rubs | | | | | | | | | | | | |
| Room Temp. | 110 | 130 | 35 | 100 | 150 | 145 | 5 | 5 | 5 | 5 | 5 | 5 |
| 100° C. | 365 | 475 | 125 | 365 | 360 | 395 | 55 | 65 | 5 | 5 | 5 | 5 |
| Viscosity (cPs) | | | | | | | | | | | | |
| Initial | 1476 | 1744 | 1294 | 1389 | 1389 | 1521 | 1395 | 1368 | 1431 | 1320 | 1383 | 1385 |
| 1 hour | gel | gel | 1473 | 5377 | 7384 | gel | 1413 | 1394 | 1402 | 1339 | 1413 | 1380 |
| 2 hours | gel | gel | 1463 | gel | gel | gel | 1454 | 1414 | 1450 | 1350 | 1557 | 1426 | ethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and 1,4-xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI)—bio-based, and, isomers of any of these.

4. The reaction mixture according to one of clauses 1 to 3, wherein the acid has a $pK_a$ of greater than 5.0

5. The reaction mixture according to one of clauses 1 to 4, wherein the acid has a $pK_a$ of greater than 5.5.

6. The reaction mixture according to one of clauses 1 to 3, wherein the acid has a $pK_a$ of from greater than 4.82 to 10.

7. The reaction mixture according to one of clauses 1 to 6, wherein the acid blocked tertiary amine catalyst comprises an amidine.

8. The reaction mixture according to one of clauses 1 to 7, wherein the acid-blocked tertiary amine catalyst comprises one selected from the group consisting of 1,8-diazabicyclo[5.4.0]undec-7ene, 7-methyl-1,5,7-triazabicyclo[4.4.0]dec-5-ene, 1,4,5,6-tetrahydro-1,2-dimethylpyrimidine, 1,2,4-triazole, sodium derivative and 2-tert-butyl-1,1,3,3-tetramethylguanidine, and combinations thereof.

9. The reaction mixture according to one of clauses 1 to 8, wherein the acid comprises a mono- or dicarboxylic acid having 1-20 carbon atoms.

10. The reaction mixture according to one of clauses 1 to 9, wherein the acid is selected from the group consisting of formic, acetic, propionic, butyric, caproic, carbolic, 2-ethylhexanoic, caprylic, cyanoacetic, pyruvic, benzoic, oxalic, malonic, succinic, phthalic, salicylic and maleic acid, and combinations thereof.

11. The reaction mixture according to one of clauses 1 to 10, wherein the polyol is one or more selected from the group consisting of polyether polyols, polyester polyols, hydroxy-containing (meth)acrylic polymers and (meth)acrylic polyols, polyurethane polyol, polycaprolactone polyol, and combinations thereof.

12. The reaction mixture according to one of clauses 1 to 11, wherein the neutralized polyol comprises the reaction product of a polyol and an acid scavenger.

13. The reaction mixture according to clause 12, wherein the acid scavenger is covalently bonded to acidic groups within the polyol and is selected from the group consisting of carbodiimides, anhydrides, epoxies, trialkylorthoformates, amine compounds, and oxazolines, and combinations thereof.

14. The reaction mixture according to one of clauses 1 to 13, wherein the solvent is selected from the group consisting of toluene, xylene, isooctane, acetone, butanone, methyl ethyl ketone, methyl amyl ketone, methyl isobutyl ketone, ethyl acetate, butyl acetate, pentyl acetate, tetrahydrofuran, ethyl ethoxypropionate, N-methyl-pyrrolidone, dimethylacetamide, dimethylformamide solvent naphtha, ethers, and mixtures thereof.

15. A method of applying the reaction mixture made according to one of clauses 1 to 14, wherein the method comprises at least one of spraying, dipping, flow coating, rolling, brushing, and pouring.

16. One of a coating, an adhesive, a casting, a composite, and a sealant comprising the reaction mixture according to one of clauses 1 to 15.

17. A method of making a composition comprising: reacting a polyuretdione resin and a neutralized polyol in the presence of an acid-blocked tertiary amine catalyst, wherein the acid has a $pK_a$ of greater than 4.82.

18. The method according to clause 17, wherein the composition further includes an additive package selected from the group consisting of flow control additives, wetting agents, and solvents.

19. The method according to one of clauses 17 and 18, wherein the polyuretdione resin comprises the reaction product of catalytic dimerization of an isocyanate.

20. The method according to clause 19, wherein the isocyanate is selected from the group consisting of 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and 1,4-xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI)—bio-based, and, isomers of any of these.

21. The method according to one of clauses 17 to 20, wherein the acid has a $pK_a$ of greater than 5.0.

22. The method according to one of clauses 17 to 21, wherein the acid has a $pK_a$ of greater than 5.5.

23. The method according to one of clauses 17 to 22, wherein the acid has a $pK_a$ of from greater than 4.82 to 10.

24. The method according to one of clauses 17 to 23, wherein the acid blocked tertiary amine catalyst comprises an amidine.

25. The method according to one of clauses 17 to 24, wherein the acid-blocked tertiary amine catalyst comprises one selected from the group consisting of 1,8-diazabicyclo[5.4.0]undec-7ene, 7-methyl-1,5,7-triazabicyclo[4.4.0]dec-5-ene, 1,4,5,6-tetrahydro-1,2-dimethylpyrimidine, 1,2,4-triazole, sodium derivative and 2-tert-butyl-1,1,3,3-tetramethylguanidine, and combinations thereof.

26. The method according to one of clauses 17 to 25, wherein the acid comprises a mono- or dicarboxylic acid having 1-20 carbon atoms.

27. The method according to one of clauses 17 to 26, wherein the acid is selected from the group consisting of formic, acetic, propionic, butyric, caproic, carbolic, 2-ethylhexanoic, caprylic, cyanoacetic, pyruvic, benzoic, oxalic, malonic, succinic, phthalic, salicylic and maleic acid, and combinations thereof.

28. The method according to one of clauses 17 to 27, wherein the polyol is one or more selected from the group consisting of polyether polyols, polyester polyols, hydroxy-containing (meth)acrylic polymers and (meth)acrylic polyols, polyurethane polyol, polycaprolactone polyol, and combinations thereof.

29. The method according to one of clauses 17 to 28, wherein the neutralized polyol comprises the reaction product of a polyol and an acid scavenger.

30. The method according to clause 29, wherein the acid scavenger is covalently bonded to acidic groups within the polyol and is selected from the group consisting of carbodiimides, anhydrides, epoxies, trialkylorthoformates, amine compounds, and oxazolines, and combinations thereof.

31. The method according to one of clauses 17 to 30, wherein the solvent is selected from the group consisting of toluene, xylene, isooctane, acetone, butanone, methyl ethyl ketone, methyl amyl ketone, methyl isobutyl ketone, ethyl acetate, butyl acetate, pentyl acetate, tetrahydrofuran, ethyl ethoxypropionate, N-methyl-pyrrolidone, dimethylacetamide, dimethylformamide solvent naphtha, ethers, and mixtures thereof.

32. The method according to one of clauses 17 to 31, wherein the step of reacting occurs at 20° C. to 25° C.

33. The method according to one of clauses 17 to 32, wherein reaction of the polyuretdione resin and the polyol occurs in the presence of the acid-blocked tertiary amine catalyst at a temperature of between 20° C. to 130° C.

34. The method according to clause 33, wherein the temperature is 100° C.

35. A method of applying the reaction mixture made according to one of clauses 17 to 34, wherein the method comprises at least one of spraying, dipping, flow coating, rolling, brushing, and pouring.

36. One of a coating, an adhesive, a casting, a composite, and a sealant comprising the composition made according to the method of one of clauses 17 to 35.

What is claimed is:

1. A reaction mixture comprising:
   a polyuretdione resin;
   a neutralized polyol; and
   an acid-blocked tertiary amine catalyst;
   a hydrocarbon solvent; and
   optionally,
   an additive package selected from the group consisting of flow control additives, and wetting agents,
   wherein the acid has a $pK_a$ of greater than 4.82.

2. The reaction mixture according to claim 1, wherein the polyuretdione resin comprises the reaction product of catalytic dimerization of an isocyanate.

3. The reaction mixture according to claim 2, wherein the isocyanate is selected from the group consisting of 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and 1,4-xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI)—bio-based, and, isomers of any of these.

4. The reaction mixture according to claim 1, wherein the acid blocked tertiary amine catalyst comprises an amidine.

5. The reaction mixture according claim 1, wherein the acid-blocked tertiary amine comprises one of 1,8-diazabicyclo[5.4.0]undec-7ene, 7-methyl-1,5,7-triazabicyclo[4.4.0]dec-5-ene, 1,4,5,6-tetrahydro-1,2-dimethylpyrimidine, sodium-1,2,4-triazolide and 2-tert-butyl-1,1,3,3-tetramethylguanidine, and combinations thereof.

6. The reaction mixture according to claim 1, wherein the acid is selected from the group consisting of formic, acetic, propionic, butyric, caproic, carbolic, 2-ethyl-hexanoic, caprylic, cyanoacetic, pyruvic, benzoic, oxalic, malonic, succinic, phthalic, salicylic and maleic acid, and combinations thereof.

7. The reaction mixture according to claim 1, wherein the acid has a $pK_a$ of greater than 5.0.

8. The reaction mixture according to claim 1, wherein the acid has a $pK_a$ of greater than 5.5.

9. The reaction mixture according to claim 1, wherein the acid has a $pK_a$ of from greater than 4.82 to 10.

10. The reaction mixture according to claim 1, wherein the neutralized polyol comprises the reaction product of a polyol and an acid scavenger.

11. The reaction mixture according to claim 10, wherein the acid scavenger is covalently bonded to acidic groups within the polyol and is selected from the group consisting of carbodiimides, anhydrides, epoxies, trialkylorthoformates, amine compounds, and oxazolines, and combinations thereof.

12. The reaction mixture according to claim 1, wherein the acid comprises a mono- or dicarboxylic acid having 1-20 carbon atoms.

13. The reaction mixture according to claim 1, wherein the polyol is selected from the group consisting of polyether polyols, polyester polyols, hydroxy-containing (meth)acrylic polymers and (meth)acrylic polyols, polyurethane polyols, polycarbonate polyols and polycaprolactone polyols, and combinations thereof.

14. One of a coating, an adhesive, a casting, a composite, and a sealant comprising the reaction mixture according to claim 1.

15. A method of making a composition comprising: reacting a polyuretdione resin and a neutralized polyol, in the presence of an acid-blocked tertiary amine catalyst and a hydrocarbon solvent, wherein the acid has a $pK_a$ of greater than 4.82 and wherein reaction optionally includes an additive package selected from the group consisting of flow control additives, and wetting agents.

16. The method according to claim 15, wherein the polyuretdione resin comprises the reaction product of catalytic dimerization of an isocyanate.

17. The method according to claim 16, wherein the isocyanate is selected from the group consisting of 1,4-tetramethylene diisocyanate, 1,6-hexamethylene diisocyanate (HDI), 2,2,4-trimethyl-1,6-hexamethylene diisocyanate, 1,12-dodecamethylene diisocyanate, cyclohexane-1,3- and 1,4-diisocyanate, 1-isocyanato-2-isocyanato-methyl cyclopentane, 1-isocyanato-3-isocyanatomethyl-3,5,5-trimethyl cyclohexane (isophorone diisocyanate or IPDI), bis-(4-isocyanatocyclohexyl)methane, 1,3- and 1,4-bis(isocyanatomethyl)-cyclohexane, bis-(4-isocyanato-3-methyl-cyclohexyl)-methane, α,α,α',α'-tetramethyl-1,3- and 1,4-xylene diisocyanate, 1-isocyanato-1-methyl-4(3)-isocyanato-methyl cyclohexane, and 2,4- and 2,6-hexahydrotoluene diisocyanate, toluene diisocyanate (TDI), diphenylmethane diisocyanate (MDI), pentane diisocyanate (PDI) bio-based, and, isomers of any of these.

18. The method according to claim 15, wherein the acid blocked tertiary amine catalyst comprises an amidine.

19. The method according to claim 15, wherein the acid-blocked tertiary amine catalyst comprises one of 1,8-diazabicyclo[5.4.0]undec-7ene, 7-methyl-1,5,7-triazabicyclo[4.4.0]dec-5-ene, 1,4,5,6-tetrahydro-1,2-dimethylpyrimidine, sodium-1,2,4-triazolide and 2-tert-butyl-1,1,3,3-tetramethylguanidine, and combinations thereof.

20. The method according to claim 15, wherein the acid is selected from the group consisting formic, acetic, propionic, butyric, caproic, carbolic, 2-ethyl-hexanoic, caprylic, cyanoacetic, pyruvic, benzoic, oxalic, malonic, succinic, phthalic, salicylic and maleic acid, and combinations thereof.

21. The method according to claim 15, wherein the acid has a $pK_a$ of greater than 5.0.

22. The method according to claim 15, wherein the acid has a $pK_a$ of greater than 5.5.

23. The method according to claim 15, wherein the acid has a p$K_a$ of from greater than 4.82 to 10.

24. The method according to claim 15, wherein the neutralized polyol comprises the reaction product of a polyol and an acid scavenger.

25. The method according to claim 24, wherein the acid scavenger is covalently bonded to acidic groups within the polyol and is selected from the group consisting of carbodiimides, anhydrides, epoxies, trialkylorthoformates, amine compounds, and oxazolines, and combinations thereof.

26. The method according to claim 15, wherein the acid comprises a mono- or dicarboxylic acid having 1-20 carbon atoms.

27. The method according to claim 15, wherein the polyol is selected from the group consisting of polyether polyols, polyester polyols, hydroxy-containing (meth)acrylic polymers and (meth)acrylic polyols, polyurethane polyols, polycarbonate polyols and polycaprolactone polyols, and combinations thereof.

28. The method according to claim 16, wherein reaction of the polyuretdione resin and the polyol occurs in the presence of the acid-blocked tertiary amine catalyst at a temperature of between 20° C. to 130° C.

29. One of a coating, an adhesive, a casting, a composite, and a sealant comprising a composition made according to the method of claim 15.

* * * * *